(12) United States Patent
Bender

(10) Patent No.: US 10,760,937 B2
(45) Date of Patent: Sep. 1, 2020

(54) SYSTEM AND METHOD FOR MEASURING THE LEVEL OF FLUID IN A CONTAINER

(71) Applicant: RV Whisper LLC, Owings, MD (US)

(72) Inventor: Edward Bender, Owings, MD (US)

( * ) Notice: Subject to any disclaimer, the term of this patent is extended or adjusted under 35 U.S.C. 154(b) by 188 days.

(21) Appl. No.: 16/123,118

(22) Filed: Sep. 6, 2018

(65) Prior Publication Data

US 2019/0078924 A1    Mar. 14, 2019

Related U.S. Application Data

(60) Provisional application No. 62/555,882, filed on Sep. 8, 2017.

(51) Int. Cl.
*G01F 23/24*    (2006.01)
*G01F 23/26*    (2006.01)

(52) U.S. Cl.
CPC .......... *G01F 23/243* (2013.01); *G01F 23/242* (2013.01); *G01F 23/261* (2013.01);
(Continued)

(58) Field of Classification Search
CPC .... G01F 23/266; G01F 23/263; G01F 23/268; G01F 23/24; G01F 23/241
See application file for complete search history.

(56) References Cited

U.S. PATENT DOCUMENTS 3,279,379 A * 10/1966 Klyce ...................... G05D 9/12
                                                       417/36
3,375,716 A *  4/1968 Hersch .................. G01F 23/266
(Continued)

FOREIGN PATENT DOCUMENTS

JP         57111416 A  *  7/1982  ........... G01F 23/263

OTHER PUBLICATIONS

Kate Ovchinnokova and Gerald H. Pollack, Can Water Store Charge?, Langmuir: the ACS journal of surfaces and colloids, Jan. 6, 2009, 542-547, vol. 25,1, ACS Publications.

*Primary Examiner* — David A. Rogers
(74) *Attorney, Agent, or Firm* — Laubscher & Laubscher P.C.

(57) ABSTRACT

A system includes a container having an inner chamber for storing fluid, at least one measuring probe arranged within the chamber and one ground probe arranged within or near a bottom of the chamber. There is at least one impedance electrically connected with a processor which is electrically connected with the at least one measuring probe. A signal generator has a first voltage terminal electrically connected with the at least one impedance and a second voltage terminal electrically connected with the ground probe. When a signal is sent from the signal generator to the measuring probe, an electrochemical reaction occurs at the measuring probe and ground probe and stores a charge if the measuring probe and/or ground probe are immersed in fluid. The processor measures the voltage, current and power of the signal to calculate the resistance and capacitance of the fluid within the container to determine the level of fluid in the container. A method for measuring the level of fluid in the container includes the steps of applying at least one time-varying voltage signal to the one or more measuring probes, creating an electrochemical reaction between the ground probe and each measuring probe, storing energy around each probe that is submerged in fluid, measuring the current and power of the signals, and determining the level of fluid in the container based on the calculated capacitance and resistance of the fluid within the container.

12 Claims, 4 Drawing Sheets

(52) U.S. Cl.
CPC ............ *G01F 23/24* (2013.01); *G01F 23/241* (2013.01); *G01F 23/263* (2013.01); *G01F 23/266* (2013.01); *G01F 23/268* (2013.01)

(56) References Cited

U.S. PATENT DOCUMENTS

| | | | | |
|---|---|---|---|---|
| 3,956,760 | A * | 5/1976 | Edwards | G01F 23/24 340/620 |
| 4,382,382 | A * | 5/1983 | Wang | G01F 23/243 340/620 |
| 4,383,443 | A * | 5/1983 | Langdon | G01F 23/2966 73/290 V |
| 4,423,629 | A * | 1/1984 | Ara | G01F 23/248 374/54 |
| 4,720,997 | A * | 1/1988 | Doak | G01F 23/246 327/512 |
| 4,806,847 | A * | 2/1989 | Atherton | G01F 23/266 324/665 |
| 4,841,227 | A * | 6/1989 | Maier | G01F 23/266 324/608 |
| 4,879,902 | A * | 11/1989 | Loniello | G01F 23/242 73/304 R |
| 5,111,692 | A * | 5/1992 | McQueen | G01F 1/6986 73/204.17 |
| 5,287,086 | A * | 2/1994 | Gibb | F04B 23/021 324/660 |
| 5,611,240 | A * | 3/1997 | Yamaguchi | G01F 23/266 324/663 |
| 5,726,578 | A * | 3/1998 | Hook | G01N 22/04 324/601 |
| 6,095,178 | A * | 8/2000 | Gilbert | F16K 21/18 137/197 |
| 6,334,360 | B1 * | 1/2002 | Chen | G01F 23/243 340/620 |
| 6,337,959 | B1 * | 1/2002 | Kwak | G01F 23/265 399/237 |
| 6,362,632 | B1 * | 3/2002 | Livingston | G01F 23/266 324/629 |
| 6,443,006 | B1 * | 9/2002 | Degrave | G01F 23/266 340/620 |
| 7,057,393 | B2 * | 6/2006 | Cargol | G01N 27/221 324/444 |
| 7,370,528 | B2 * | 5/2008 | Scardovi | G01F 23/261 |
| 7,739,907 | B2 * | 6/2010 | Boiarski | A61B 10/007 73/149 |
| 7,997,132 | B2 * | 8/2011 | Ross, Jr. | G01F 23/265 73/290 B |
| 8,024,969 | B2 * | 9/2011 | Kawaguchi | G01F 23/363 73/304 R |
| 8,820,158 | B2 * | 9/2014 | Oike | G01D 5/165 73/317 |
| 9,423,286 | B2 * | 8/2016 | Nishimura | G21C 17/035 |
| 2001/0000851 | A1 * | 5/2001 | Morimoto | G01F 23/266 |
| 2002/0124643 | A1 * | 9/2002 | Robinson | G01F 23/2924 73/290 R |
| 2007/0245823 | A1 * | 10/2007 | Scardovi | G01F 23/263 |
| 2008/0295592 | A1 * | 12/2008 | Kawaguchi | G01F 23/363 73/304 R |
| 2012/0065904 | A1 * | 3/2012 | Tichborne | G01F 23/265 702/55 |

\* cited by examiner

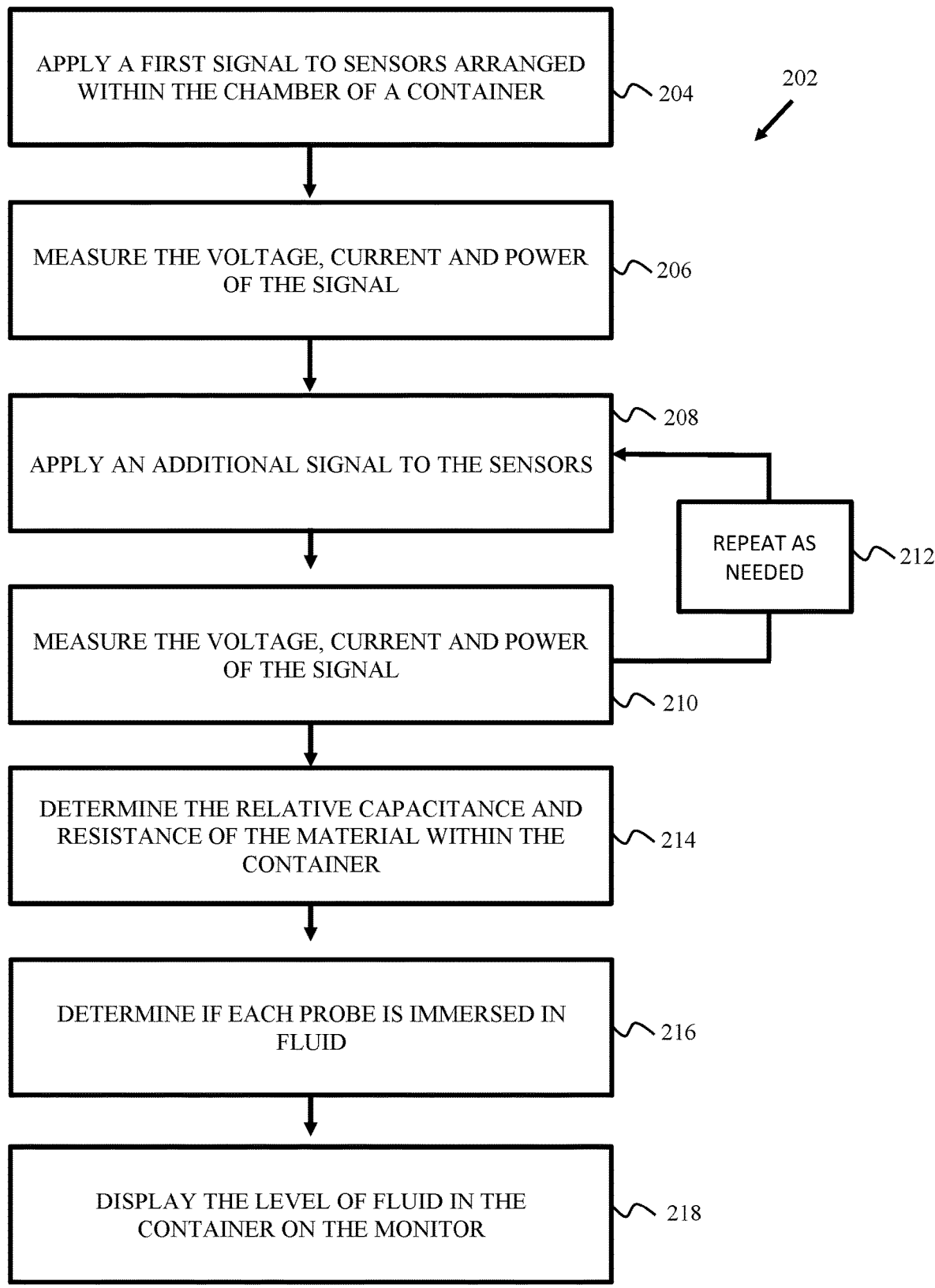

SYSTEM AND METHOD FOR MEASURING THE LEVEL OF FLUID IN A CONTAINER

This application is based on U.S. provisional application No. 62/555,882 filed Sep. 8, 2017.

BACKGROUND OF THE DISCLOSURE

The present disclosure relates to a system and method for measuring the level of fluid in a container and more specifically to measuring the level of fluid in a container based on an electrochemical reaction between measuring probes.

Electrical probes for measuring the level of fluid in a container are known in the art. Such probes are located either on the inside or outside of a container and are used to measure the resistance or capacitance of materials within the container to determine the level of fluid in the container. This disclosure focuses on the use of such containers with recreational vehicles (RVs), however it will be understood that the systems disclosed herein could be used for measuring any container with fluid.

Resistance-based probes for fluid-level measurements are used often in RVs to monitor the level of fluid in the many containers used for storing supplies and waste. Many of these probe systems are subject to inaccurate measurements over time due to residues that accumulate on container interiors between the probes and/or on the surface of the probes. This accumulation often results in an abnormal electrical resistance path between the probes, as compared to a container without interior surface residue accumulation.

In most RVs, wastewater from sinks and showers is stored in one or more "gray water" containers, waste from toilets is stored in one or more "black water" containers, and fresh water supply is held in one or more separate "fresh water" containers. Most RVs include a rather simple system for measuring how full those containers are. Most commonly, the containers are monitored by electrical resistance-based probes and a resistance-based monitoring system. Those systems typically include three measuring probes and a ground probe. The three measuring probes are typically arranged in vertically spaced relation of equal distances along the inner surface of one side of a container, for denoting when the container is empty, ⅓ full, ⅔ full, or entirely full. The container is made of a non-conductive material and the probes are most often made of a stainless steel. The probes penetrate the container to provide an electrical connection through the container wall.

After a number of container empty/fill cycles, the resistance-based monitoring systems provide less accurate and less reliable measurements of black and gray water container levels compared to the freshwater container level. Those inaccurate results are most commonly due to an accumulation of sludge, soap scum, or other materials on the inside of the container walls and/or on the probe surfaces. Sludge build-up provides a low electrical resistance path between the probes and causes electrical resistance-based monitors to inaccurately determine that a probe is submerged in water even when it is not.

Inaccurate container measurements cause frustration and anxiety for many RV owners. They can cause an RV owner to interrupt his or her vacation to drive to the dump station and empty the supposedly full gray and/or black water containers. When the owner reaches the dump station, he or she realizes that the containers may actually be empty or only partially full, either of which do not require a trip to the dump station. Some RV owners spend considerable time and money rinsing and cleaning their containers just to keep the container sensors working reasonably well. In addition to the time that is wasted, frequently cleaning a container to ensure the monitor system works properly requires additional resources which costs more money and can harm the environment.

In addition to the resistance-based monitoring systems typically found in RVs, capacitance-based systems can also be used, typically as a retrofit system. The capacitance-based monitoring systems currently available in the market utilize capacitance probes that are not in contact with the material inside the container but instead use conductive plates affixed to the outside surface of the containers, creating a standard capacitance-based system with dielectric material between plate.

These capacitance-based monitoring systems typically require their special capacitance probes to be applied to the container surfaces at various levels, rather than using standard and/or existing probes, and thus are more expensive for the RV manufacturers to purchase and install compared to the very simple resistance-based probes. Some owners of RVs that come with resistance-based probe monitoring systems purchase and install one of the capacitance-based monitoring systems to obtain more accurate and reliable container level monitoring, but the installation can be difficult and costly.

SUMMARY OF THE DISCLOSURE

Accordingly, it is an object of the present disclosure to provide a resistance and capacitance-based monitoring system for containers with low-cost electrical resistance-based measuring probes that rely on electrochemical reactions to determine the level of fluid in the container.

The system includes a container having an inner chamber for storing fluid, at least one measuring probe arranged within the chamber and one ground probe arranged near the bottom of the chamber. There is at least one impedance electrically connected with a processor which is electrically connected with at least one measuring probe. A signal generator has a first voltage terminal electrically connected with at least one impedance and a second voltage terminal electrically connected with the ground probe. When a signal is sent from the signal generator through the impedance to the measuring probe, an electrochemical reaction occurs between the measuring probe and the ground probe and stores a charge if the measuring probe and ground probe are both immersed in fluid. The processor measures the voltage, current and power of the signal to calculate the resistance and capacitance of the fluid within the container to determine the level of fluid in the container. Preferably, the signal generator includes a variable-voltage. Further, it is preferable for the container to have three measuring probes arranged in vertically spaced relation for determining whether the container is empty, ⅓ full, ⅔ full, or full.

In an alternate embodiment, the impedance of the system is one of a resistor, inductor and capacitor, and is either variable or fixed. In yet another embodiment, there is at least one resistor between the processor and measuring probe.

It is further an object of the present disclosure to provide a method for measuring the level of fluid in a container that has at least one measuring probe connected with a voltage source at a first terminal and one ground probe arranged near the bottom of the chamber and connected with a voltage source at a second terminal. The method includes the steps of applying at least one time-varying voltage signal to the measuring probes, creating an electrochemical reaction between the ground probe and each measuring probe that is submerged in fluid, measuring the voltage, current and power of the signals, and determining the level of fluid in the container based on the calculated capacitance and resistance of the fluid within the container.

Preferably, measuring the voltage, current, and power of the signals is performed by a processor arranged between the voltage source and one or more measuring probes.

In an alternate embodiment, the method further includes the step of introducing an impedance to the voltage source prior to applying a signal. Preferably, the impedance is variable, but it could also be fixed.

BRIEF DESCRIPTION OF THE FIGURES

Other objects and advantages of the disclosure will become apparent from a study of the following specification when viewed in the light of the accompanying drawing, in which:

FIG. 4 is a flow chart according to one embodiment of the method of the present disclosure.

DETAILED DESCRIPTION

Figure 1:
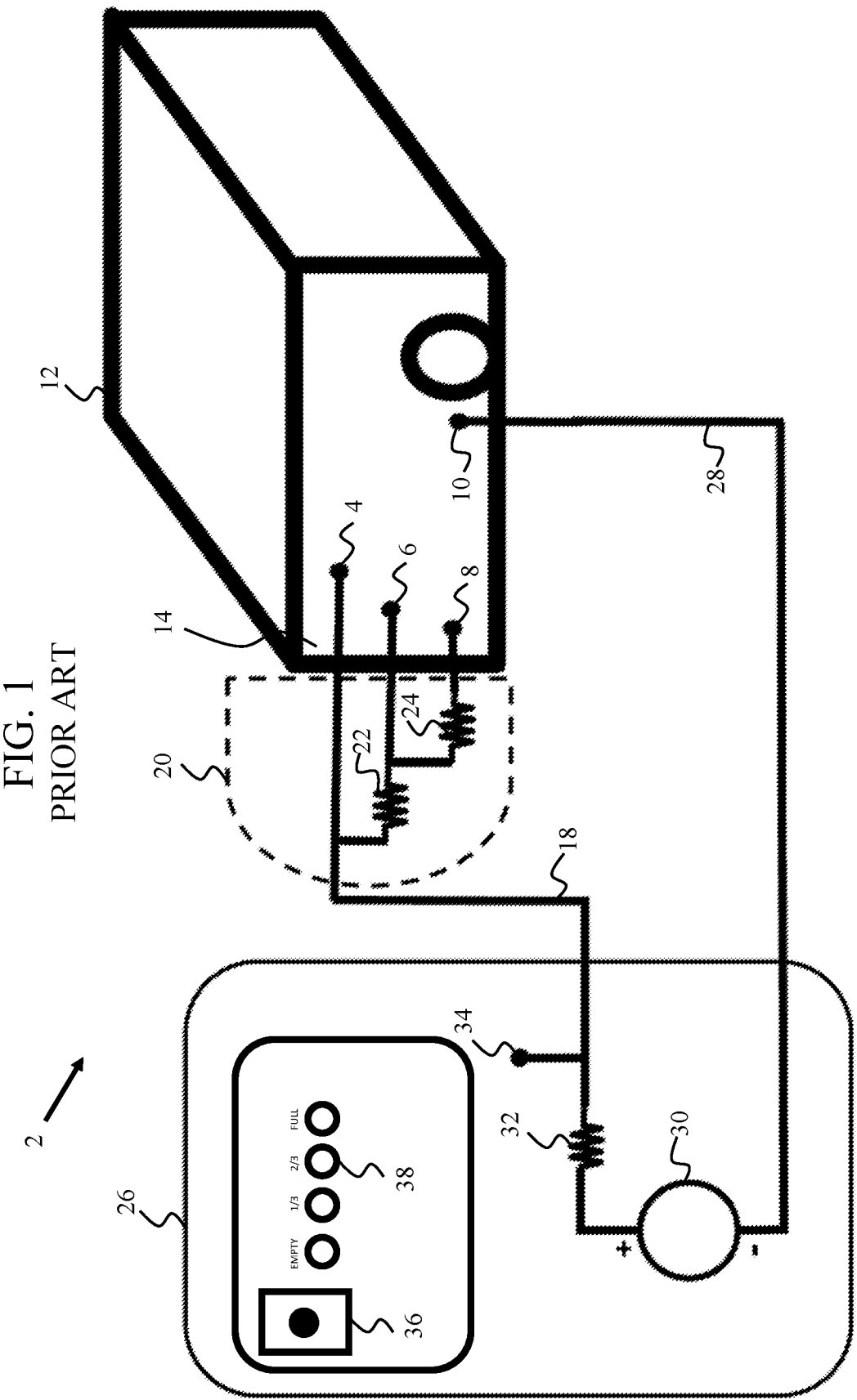
FIG. 1 is a schematic circuit for conducting resistance-based fluid level measurements according to the prior art.

FIG. 1 is a schematic circuit for a low-cost container monitoring system 2 that utilizes electrical resistance-based probes 4, 6, 8, 10 that are installed through the walls of a fluid container 12 of a recreational vehicle (RV). The electrical resistance-based probes are typically stainless steel and penetrate a plastic, non-conducting container wall 14 at three levels. A ground probe 10 is installed within the container wall at the same level of the lowest probe 8. On the interior of the container (not shown), the probes have a rounded surface with approximately a 1-centimeter diameter exposed to the container contents. On the exterior of the container, the probes can be easily connected to a wire. The three probes that are installed at different levels are connected to each other through a sealed resistor pack 20, containing resistors 22, 24, which connects to a probe wire 18, which in turn connects to a monitor panel 26 located in the living space of the RV. The ground probe 10 is connected to a ground wire 28 which also connects to the monitor panel. The monitor panel 26 includes a voltage source 30 connected to a resistor 32, and a mechanism 34 for measuring the resistance of material held within the container when a signal is sent from the voltage source to the container.

To determine the level of liquid in the container, a user pushes a momentary contact switch 36 on the monitor panel 26 for several seconds. While the momentary contact switch is held down, the monitor panel creates a simple direct current test voltage—typically around eight volts—at the voltage source 30 that sends current through the resistor 32 and then to the probe wire 18 that runs to the probe pack 20, probes 4, 6, 8 and container 12. The measuring mechanism 34 measures the voltage, which varies according to the electrical resistance between the measuring probes 4, 6, 8 and ground probe 10. The monitor panel processes the effective resistance of the container probe system and illuminates one or more light-emitting diodes (LED) 38 on the display panel based on the effective resistance. The number of illuminated LEDs indicates to the user if the container level is empty, ⅓ full, ⅔ full, or completely full.

The electrical resistance-based probes of the prior art operate on the principle that the materials inside a container have different electrical resistances. For example, water in a container conducts electricity between probes much better than air in the same container. In RV waste containers of the prior art, repeated empty/fill cycles cause the container walls and/or measuring probe surfaces to accumulate sludge or other materials that change the electrical resistance between the probes. The buildup of sludge in dirty containers wets the surface of the container wall between probes as well as the probe surfaces themselves, even when the fluid level is well below the probe levels. The presence of fluid or other materials on the walls of an empty container often creates a low electrical resistance path between the probes which leads the system to determine that the probes are immersed in fluid when they actually are not. With repeated empty/fill cycles, the containers will provide less and less accurate readings. RV users thus cannot rely on the measuring system for accurate results.

Figure 2:
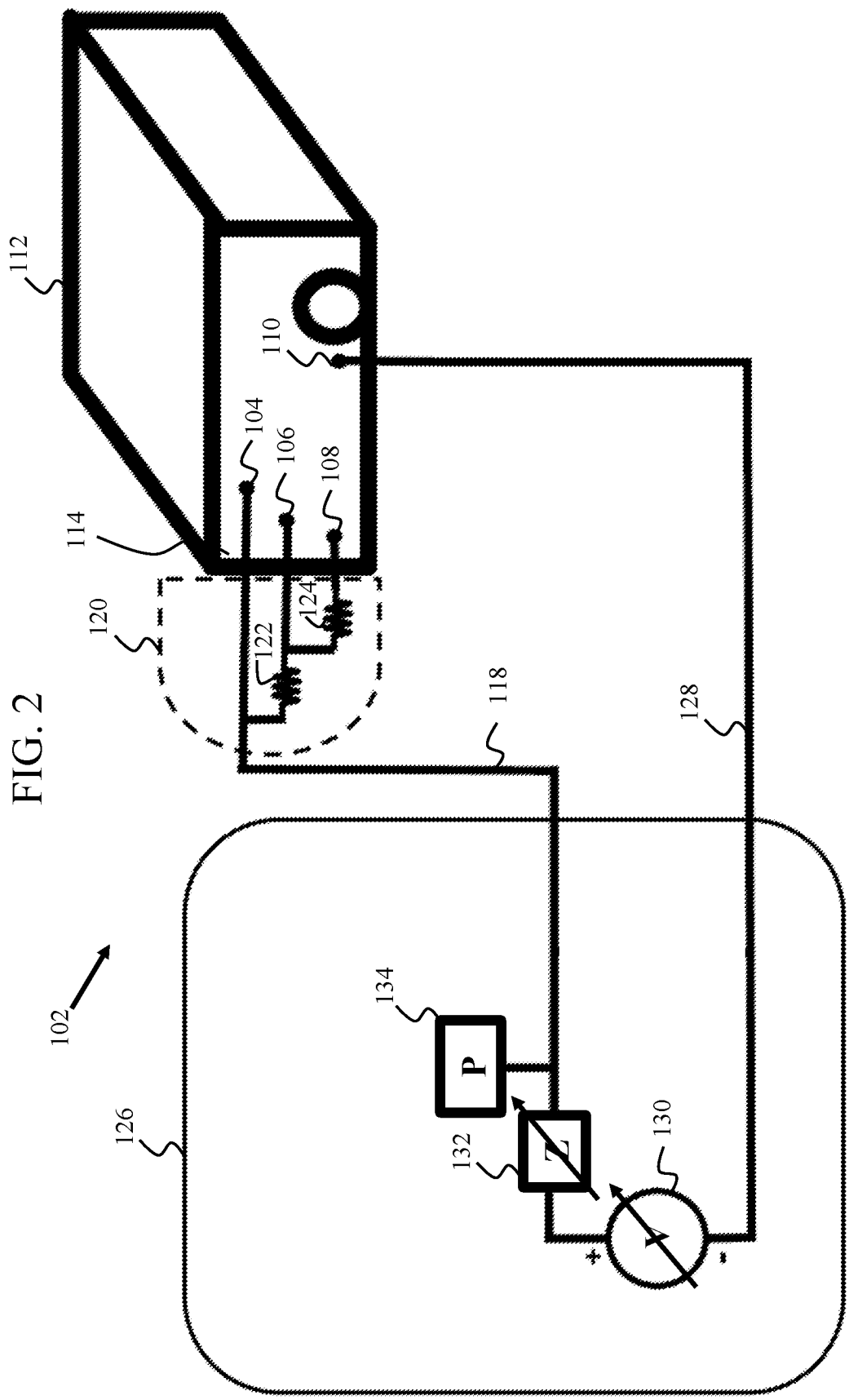
FIG. 2 is a schematic circuit according to one embodiment of the system of the present disclosure.

Rather than just rely on the resistance of the material within a container, the present system and method uses the property of a fluid to behave like an electrical capacitor when electric current runs through it. FIG. 2 shows one embodiment of the system 102 disclosed herein, which includes electrical measuring probes 104, 106, 108 and ground probe 110 that are installed through the walls of a fluid container 112 of a recreational vehicle. The probes and container can be the legacy probes of an RV system as disclosed in FIG. 1 or can be newly installed. The measuring probes 104, 106, 108 penetrate a plastic, non-conducting container wall 114 at three levels and the ground probe 110 penetrates the container wall 114 at the same level as probe 108. The probes 104, 106, and 108 are connected to a resistor pack 120 which is connected to a wire 118 and to a device 126 which connects to the monitor panel (not shown) located in the living space of the RV. The ground probe 110 is connected to a ground wire 128 which also connects to the device.

The device 126 includes a variable-voltage source 130 for sending an electrical signal to the container 112, a variable impedance 132 connected with the voltage source, and a processor 134. The processor can be any device that can measure and process the voltage, current and power of the system when a signal is sent from the variable-voltage source. The processor also calculates the resistance and capacitance of the material within the container based on the measured voltage, current and power.

The system can apply to monitoring levels in any container, well, or fluid-holding container that is filled with different materials that have different electrical resistance and/or different capacitance properties. Examples of materials inside containers include water and air, oil and water, or a container filled with a fluid and some other gas or vapor. Electrical measuring probes can be used to determine what, if any, substance is covering which probe. The system and method disclosed herein correctly determine which fluid or substance is in contact with a probe even when the interior surface of the container between electrical measuring probes are dirty, which for prior art systems would result in an inaccurate reading.

For the system shown in FIG. 2, the wire harness of the legacy container which houses the probe wire 118 and ground wire 128 is disconnected from the monitor panel (not shown) and connected with the device 126 which houses a variable-voltage source 130, variable impedance 132 and processor 134. That device is connected to the monitor panel. It will be understood by those of ordinary skill in the art that the elements of the system disclosed in FIG. 2 could be arranged differently but function just the same.

In practice, the system sends a signal from the voltage source 130 to the container 112 and the voltage, current and power of the signal are measured by the processor 134. The processor will calculate the resistance and capacitance of the material within the container to determine if and how many probes are submerged in fluid. Advantageously, the legacy probes 104, 106, 108 and 110, probe resistor pack 120, probe wiring 118 and ground wiring 128 of the RV system, as disclosed in FIG. 1, can remain in the RV, making it simple to convert from the old system and method to the system and method disclosed herein.

In an alternate embodiment, an additional variable impedance is arranged between the processor and ground probe. In another embodiment, analog switches are used to vary the voltage and/or impedances. The voltage can then be measured by the processor as the voltage source and impedances are varied to more accurately measure the resistance and capacitance of the material in the container.

Figure 3:
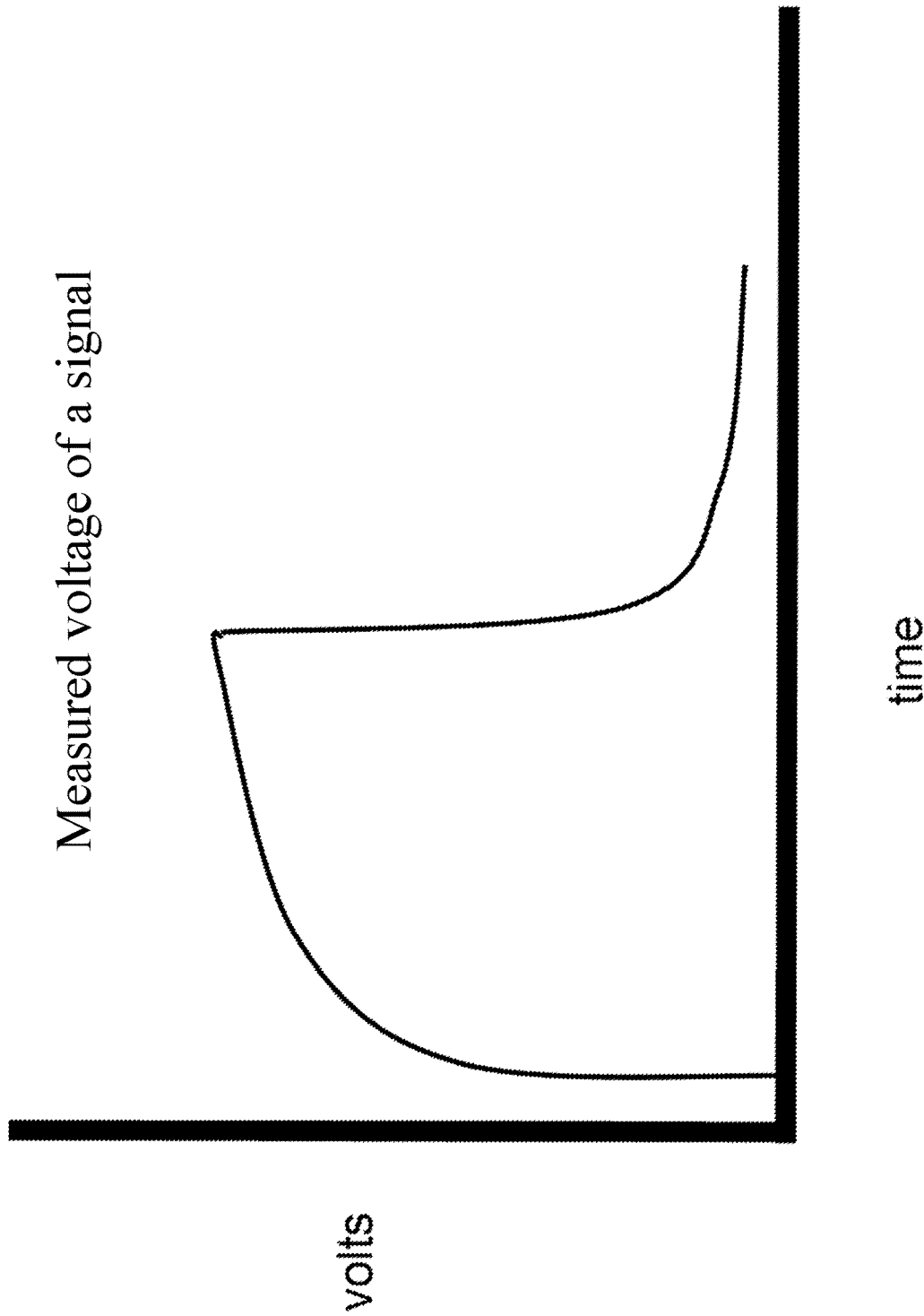
FIG. 3 is a chart demonstrating the time-varying voltage of a material having capacitance properties.

FIG. 3 is a graph demonstrating how the voltage for a system having capacitance properties changes over time. The signal is sent, and if fluid is present between at least one probe and the ground probe, the voltage increases over several seconds. Following the pulse of the signal, the voltage decreases over time. This rising and falling voltage over time as current flows indicates the presence of something in the circuit that acts like an electrical capacitor. The resistance-based RV monitoring circuits of the prior art ignore how the signal varies over time and only measure the current voltage level.

The present disclosure uses the capacitance properties to more accurately measure the level of fluid in a container. Application of a positive or negative voltage across probes or a probe pack for a period of time (several seconds under some conditions) causes an increase in voltage difference between the probes during that timeframe. The amount the voltage changes is proportional to how many of the probes are actually in contact with fluids, as opposed to simply being affected by surface wetness or sludge build up inside a container wall.

The electrical capacitance measurements of the present disclosure are completed by using typical time domain measurements where voltage, current and power are measured over time. Other embodiments may use frequency domain measurement techniques such as measuring the phase shift and amplitude change of the voltage by the processor relative to the voltage source. Other frequency domain circuit analysis techniques can also be used. In the case of fluid water, when a charge is applied and held across the probes, an electrochemical reaction takes place at the probe/water interface that causes the water near the probes to be charged by changing the pH of the water around the probes. The anode, or positively charged measuring probe, creates a positively charged fluid near it while the cathode, or negatively charged measuring probe, creates a negatively charged field near it. The charged field can extend over a centimeter if charged long enough—five or ten seconds under certain conditions—at a high enough voltage. Eight volts of direct current is typically adequate. The electrically charged water retains some of the charge when the signal from the voltage source is stopped, and the charge can be seen to decay with the typical exponential decay rate of capacitors. During the entire process, the charge increases and decreases with the typical exponential rise or fall of voltage across a capacitor to an asymptotic level.

The amount of charge that can be stored in the fluid near a probe while the signal is sent is dependent upon the amount of fluid near the probe. Surface wetness due to sludge and dirty container walls presents a low resistance path for current to flow through but offer little capacity to store a charge. Surface wetness does store some level of charge, but it is significantly lower than the charge that can be stored when the probe is submerged in fluid. The electrochemical reaction takes place at the cathode and anode, but if the volume of water surrounding the probe is too small, the electrolysis byproducts, hydrogen and oxygen gas molecules, quickly diffuse and evaporate. If the anode or cathode is surrounded by water, the H2 and O2 molecules stay dissolved longer and retain the electrical charge. Testing has shown that water becomes charged for more than 2.5 cm away from the probe surface when the probe is submerged in water and current runs through it. Testing has also shown that water retains that charge, and the amount of charge can be measured when discharged through a resistor.

FIG. 4 is one embodiment of how the concepts detailed above could be carried out in a method 202 for measuring the resistance and capacitance of the material within a container. The device applies a time-varying voltage signal to one or more measuring probes 204. This creates an electrochemical reaction between the ground probe and measuring probes. The voltage, current and power of the first signal is measured 206, preferably by a processor, and then a second signal is sent 208 and the voltage, current and power are once again measured 210. Sending a signal and measuring the voltage, current and power can be repeated numerous times 212 to obtain more accurate measurements. These measurements are analyzed and compared to determine the relative capacitance and resistance of the material within the container 214, which in turn can be used to determine the level of fluid in the container 216. Lastly, the level of fluid in the container is displayed on a monitor panel within the living space of the RV 218.

In an alternate method, an impedance is introduced to the voltage source prior to applying a signal. For instance, a resistor, inductor or capacitor can be applied. The impedance is preferably variable, but it could also be fixed.

Another embodiment of the invention applies and holds multiple various voltage levels for several seconds at a time and the processor measures how much the voltage changes across the probes during that timeframe. If the container is actually empty, the voltage change will be relatively low due to the small amount of water or substance on or near the probes. In this case the probes may have a millimeter or two of wet sludge attached to them. This small amount of water in contact with the probes can accumulate and hold a low-level electrical charge. The black container will be correctly identified as empty, which wouldn't be the case with the prior art systems. If the RV container is actually full of black water, the voltage will change significantly during the few seconds a signal is applied because there is plenty of water surrounding each probe that can become charged and hold the charge longer. The container will be correctly noted as full.

Although the above description is with reference to particular embodiments, it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure.

What is claimed is:

1. A system for monitoring the level of fluid in a container, comprising:
   (a) a container having an inner chamber for storing fluid;
   (b) at least one measuring probe arranged within said chamber and one ground probe arranged near or at the bottom of said chamber;
   (c) at least one impedance electrically connected with said at least one measuring probe;
   (d) a processor electrically connected with said measuring probes and said impedance; and
   (e) a signal generator having a first voltage terminal electrically connected with said impedance and a second voltage terminal electrically connected with said ground probe, whereby when a signal is sent from said signal generator to said at least one measuring probe, an electrochemical reaction between said measuring probe and said ground probe occurs and stores a charge if said measuring probe is immersed in fluid, said processor measuring the voltage, current and power of said signal to calculate the resistance and capacitance of the matter within the container to determine the level of fluid in the container.

2. A system for monitoring the level of fluid in a container as defined in claim 1, wherein said at least one impedance is one of a fixed or variable impedance.

3. A system for monitoring the level of fluid in a container as defined in claim 1, wherein a plurality of measuring probes are arranged in vertical spaced relation within the bottom of said chamber.

4. A system for monitoring the level of fluid in a container as defined in claim 1, wherein said impedance includes at least one of a resistor, inductor and capacitor.

5. A system for monitoring the level of fluid in a container as defined in claim 1, further comprising at least one resistor arranged between said processor and one of said measuring probes.

6. A system for monitoring the level of fluid in a container as defined in claim 1, wherein the signal generator includes a variable-voltage.

7. A method for measuring the level of fluid in a container having at least one measuring probe arranged within said container and connected with a voltage source at a first terminal and a ground probe arranged adjacent to a bottom of said chamber and connected with a voltage source at a second terminal, comprising the steps of:
   (a) applying at least one time-varying voltage signals to the one or more measuring probes;
   (b) creating an electrochemical reaction between the ground probe and measuring probes;
   (c) measuring the voltage and current of the signal; and
   (d) determining the level of fluid in the container based on the calculated capacitance and resistance of the fluid within the container.

8. A method for measuring the level of fluid in a container as defined in claim 7, wherein said measuring the voltage and current step also includes measuring the power of the signal.

9. A method for measuring the level of fluid in a container as defined in claim 7, wherein said measuring of the voltage, current and power of the signals step is completed by a processor arranged between the voltage source and the one or more measuring probes.

10. A method for measuring the level of fluid in a container as defined in claim 9, wherein said determining the level of a fluid step is completed by the processor.

11. A method for measuring the level of fluid in a container as defined in claim 7, and further comprising the step of introducing an impedance to the voltage source prior to applying a signal.

12. A method for measuring the level of fluid in a container as defined in claim 11, wherein said introducing an impedance step includes introducing at least one of a variable and fixed impedance.

* * * * *